United States Patent [19]
Nishikawa et al.

[11] Patent Number: 4,603,601
[45] Date of Patent: Aug. 5, 1986

[54] DIRECT-COUPLING CONTROLLER FOR A TRANSMISSION HAVING DELAY MEANS FOR TEMPORARILY RELEASING THE CLUTCH DURING SPEED CHANGE

[75] Inventors: Masao Nishikawa, Tokyo; Shinzo Sakai, Saitama; Yoichi Sato, Wako; Yukihiro Fukuda, Asaka, all of Japan

[73] Assignee: Honda Giken Kogyo Kabushiki Kaisha, Tokyo, Japan

[21] Appl. No.: 641,126

[22] Filed: Aug. 15, 1984

[51] Int. Cl.$^4$ ............ F16H 47/00; B60K 41/02
[52] U.S. Cl. .................................. 74/731; 74/733; 192/0.076; 192/3.31
[58] Field of Search ............ 192/3.31, 0.076, 0.032, 192/0.033, 0.034, 0.096, 3.57, 103 R; 74/731, 732, 733, 645, 868, 869

[56] References Cited
U.S. PATENT DOCUMENTS 4,512,212  4/1985  Ishikawa .................... 74/733
4,516,671  5/1985  Nishikawa et al. ........ 192/0.076

*Primary Examiner*—George H. Krizmanich
*Attorney, Agent, or Firm*—Armstrong, Nikaido, Marmelstein & Kubovcik

[57] ABSTRACT

A direct-coupling controller for a torque converter direct-coupling clutch in an automatic transmission. The controller includes a pilot oil pressure operated timing valve which interconnects the hydraulic cylinders of at least two of the hydraulically operated friction elements of the transmission to the hydraulic-cylinder of the direct-coupling clutch. The timing valve has two positions, a first where one of the friction elements is connected to the clutch and a second where the other is. Structure can be provided to delay movement of the timing valve spool member for a predetermined time. Additionally, a reduction valve can be interposed between the timing valve and the clutch to keep the oil pressure to the clutch at a predetermined level. A vehicle speed response valve can also be interposed between the timing valve and the clutch in parallel with the reduction valve to bypass the reduction valve when the vehicle speed exceeds a predetermined value.

6 Claims, 5 Drawing Figures

DIRECT-COUPLING CONTROLLER FOR A TRANSMISSION HAVING DELAY MEANS FOR TEMPORARILY RELEASING THE CLUTCH DURING SPEED CHANGE

BACKGROUND AND OBJECTS OF THE INVENTION

The present invention relates to a direct-coupling controller for a vehicular automatic transmission comprising a torque converter including an input member provided with a pump rotor and an output member provided with a turbine rotor; a direct-coupling clutch which can be permitted to slip and which is interposed between the input and output members for mechanically coupling the two members; and an auxiliary transmission including a plurality of stages of gear trains for transmitting the torque of said output member to a drive wheel, each of the gear trains having a hydraulic friction element such as a hydraulic clutch for actuating them. The direct-coupling controller for the torque converter is characterized in that it is actuated to mechanically couple the input and output members while minimizing the slip losses in the torque converter to as small an amount as possible.

When a direct-coupling clutch is actuated, slip of the torque converter is eliminated to make a large contribution to improvements in fuel economy and the smoothness of the ride while cruising. It is, therefore, desirable to actuate the direct-coupling clutch from as low-speed a range as possible. In order to satisfy this desire, it is necessary to solve the following problems.

The first problem is that, when the direct-coupling clutch covers the operations of two or more gear trains, such as the gear train of the highest-speed range and the gear train of the next highest-speed range (for example, the top gear train and the second gear train in an auxiliary transmission with three forward gear trains), the shock induced by a change in speed is large so that the passengers feel uncomfortable when the speed change is conducted when the direct-coupling clutch is still applied. In order to obviate this disadvantage, a variety of proposals have been proposed in which the direct-coupling clutch is released for a while during the speed change. Some of these have already been put into practice. All the proposals practiced are of the electronic control type in which the speed-change timings are electrically detected to allow the application and release of the direct-coupling clutch. The method of this type involves a mixture of two techniques, a hydraulic technique and a electronic technique, so that it is usually expensive and fairly complex in construction.

On the other hand, a number of controllers which are completely hydraulic direct-coupled clutches with no electronic control have been proposed, but none of them have been practised yet. This is simply because it has been impossible for prior-art examples of completely hydraulic controllers to release and reconnect the direct-coupling clutch with a rapid response by accurately detecting the speed-change timings under all conditions.

The present invention has been conceived in view of this problem, and a major object thereof is to provide a direct-coupling controller for the hydraulic type of torque converter which has a simple construction and a low cost, and which is able to temporarily release the connection of the direct-coupling clutch during a speed change, when the direct-coupling clutch covers the operations of the gear trains of two or more stages.

A second problem which arises when a direct-coupling clutch is actuated from a low-speed range is a reduction in the power output felt in the low-speed range. More specifically, when the torque converter is coupled directly by the action of the direct-coupling clutch, its intrinsic torque-amplifying function is lost, which raises the problem that acceleration is bad and power is insufficient within the low-speed range. This makes it necessary to set the speed-change ratio of the auxiliary transmission at a relatively low value. However, this setting is contrary to the initial objectives of fuel economy and a smooth ride. It is obvious that a solution to this problem would make it necessary to increase the number of stages in the auxiliary transmission, which would inevitably complicate its construction and increase its weight.

It is, therefore, another object of the present invention to provide a direct-coupling controller for a torque converter which can solve this problem by controlling the coupling force of the direct-coupling clutch to be a weak force in the low-speed range, and by establishing suitable slip of the direct-coupling clutch during acceleration to restore the torque-amplifying function of the torque converter to some extent.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

The present invention will be described in the following in connection with an embodiment thereof, with reference to the accompanying drawings.

Figure 1:
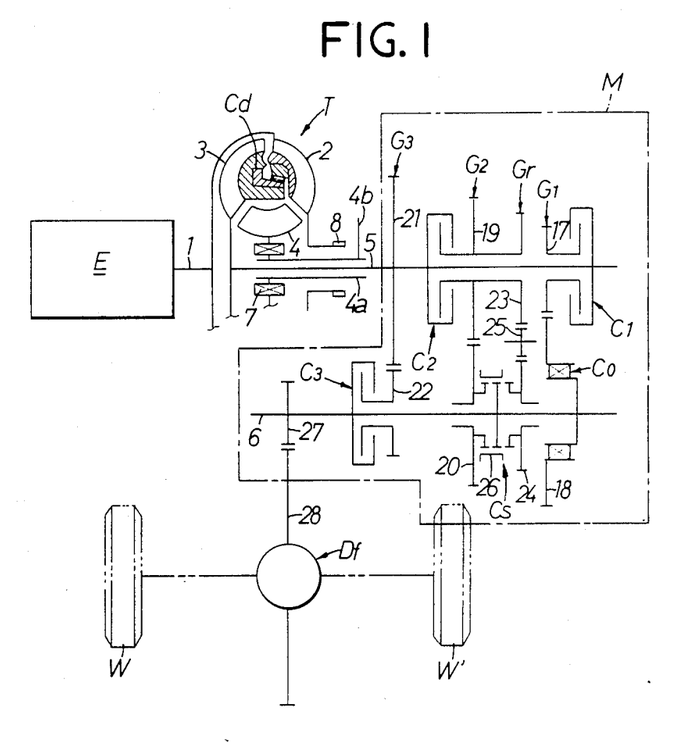
FIG. 1 is a schematic view of the vehicular automatic transmission to which the present invention is applied.

FIG. 1 is a schematic view of an automatic transmission of a vehicle with three forward speeds and one reverse speed, to which the present invention is applied. As shown, the output of an engine E is transmitted from its crankshaft 1 to a torque converter T, an auxiliary transmission M, and a differential mechanism Df in sequence to drive wheels W and W'.

The torque converter T is constructed of: a pump rotor 2 connected to the crankshaft; a turbine rotor 3 connected to an input shaft 5 of the auxiliary transmission M; and a stator 4 connected by a one-way clutch 7 to a stator shaft 4a borne rotatably on the input shaft 5. The torque transmitted from the crankshaft 1 to the pump rotor 2 is hydraulically transmitted to the turbine rotor 3 so that, if the torque is amplified in the meanwhile, its reaction is borne by the stator 4, as is well known in the art.

Figures 2, 2A:
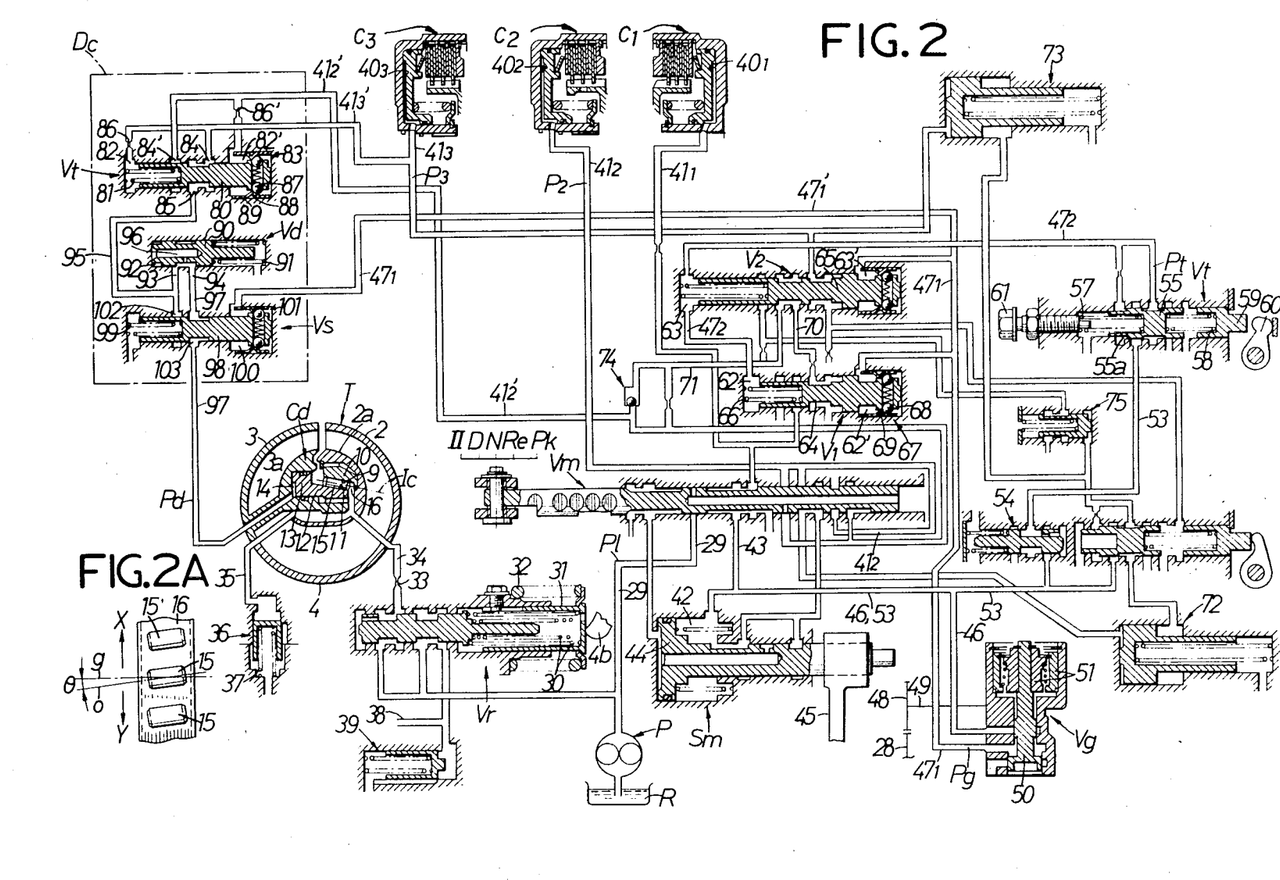
FIG. 2 is a hydraulic control circuit diagram of the automatic transmission including the controller according to the present invention.
FIG. 2A is a detail view of an essential part of the direct-coupling clutch of FIG. 2.

The right-hand end of the pump rotor 2 is provided with a pump drive gear 8 driving a hydraulic pump P of FIG. 2. A stator arm 4b is attached to the right-hand end of the stator shaft 4a to control a regulator valve Vr of FIG. 2.

A roller type of direct-coupling clutch Cd is interposed between the pump rotor 2 and the turbine rotor 3 so as to mechanically connect them. This can be seen in detail with reference to FIGS. 2 and 2A. An annular driving member 10 which has conical driving surface 9 around its inner periphery is attached to an inner circumferential wall 2a of the pump rotor 2. A driven member 12 which has about its outer periphery a conical driven surface 11 facing and parallel to the conical drive surface 9 is splined so as to be axially slidable to the inner circumferential wall 3a of the turbine rotor 3. A piston 13 is integrally formed at one end of the driven member 12 so as to fit slidably into a hydraulic cylinder 14 formed in the inner circumferential wall 3a of the turbine rotor 3. Its right and left end faces receive simultaneously the pressure within the cylinder 14 and the pressure within the torque converter T, respectively.

Cylindrical clutch rollers 15 is retained by an annular retainer 16 are provided between the conical driving and driven surfaces 9 and 11, as shown in FIG. 2A, in such a manner that their central axes o are inclined at a predetermined angle $\theta$ with respect to generators g of an imaginary conical surface Ic extending through the center between the two conical surfaces 9 and 11.

As a result, if oil pressure higher than the pressure within the torque converter T is introduced into the hydraulic cylinder 14 at a stage at which the torque-amplifying function of the torque converter T is unnecessary, the piston 13, and hence the driven member 12, is pushed toward the driving member 10. As a result, the clutch rollers 15 are forced into contact with the two conical surfaces 9 and 11. When, at this time, the driving member 10 is turned in the x direction of FIG. 2A relative to the driven member 12 by the output torque of the engine E, the clutch rollers 15 accordingly revolve about their axes. Since, however, the central axes o of the clutch rollers 15 are inclined as described above, their rotation imparts relative axial displacements to the two members 10 and 12 that make them approach each other. As a result, the clutch rollers 15 bite between the two conical surfaces 9 and 11 so that they mechanically couple the two members 10 and 12, and, thus, the pump rotor 2 and the turbine rotor 3. If, even with operation of the direct-coupling clutch Cd, the output torque of the engine E applied between the two rotors 2 and 3 exceeds the resultant coupling force, the clutch rollers 15 slip relative to each of the conical surfaces 9 and 11 so that the torque is divided into two parts, one part of which is mechanically transmitted through the direct-coupling clutch Cd, whereas the other part is hydraulically transmitted through the two rotors 2 and 3 to the input shaft 5, thus forming a kind of power-dividing system.

During the operation of the direct-coupling clutch Cd, if a negative load is applied to the torque converter T because the vehicle is decelerating, the rotational speed of the driven member 12 exceeds that of the driving member 10. As a result, the driving member 10 is turned in the y direction relative to the driven member 12, so that the clutch rollers 15 accordingly rotate about their axes in the direction opposite to the above one, to impart relative axial displacements to the two members 10 and 12 that make them separate. As a result, the clutch rollers 15 are released from their engagement with the two conical surfaces 9 and 11, and are left idling. As a result, the transmission of the negative load from the turbine rotor 3 to the pump rotor 2 is conducted only in a hydraulic manner.

If the oil pressure of the hydraulic cylinder 14 is released, the piston 13 is retracted to its initial position by the pressure within the torque converter T, so that the direct-coupling clutch Cd is inoperative.

Returning to FIG. 1, a low-speed gear train $G_1$, a middle-speed gear train $G_2$, a high-speed gear train $G_3$, and a reverse gear train Gr are interposed between the input and output shafts 5 and 6 of the auxiliary transmission M, which are arranged parallel to each other. The low-speed gear train $G_1$ is constructed of a driving gear 17 connected to the input shaft 5 by a low-speed clutch $C_1$, and a driven gear 18 which is connected to the output shaft 6 by a one-way clutch $C_0$ and which meshes with the driving gear 17. Similarly, the middle-speed gear train $G_2$ is constructed of a driving gear 19 connected to the input shaft 5 by a middle-speed clutch $C_2$, and a driven gear 20 which is connected to the output shaft 6 by a switching clutch Cs and which meshes with the driving gear 19. The high-speed gear train $G_3$ is constructed of a driving gear 21 fixed to the input shaft 5, and a driven gear 22 connected to the output shaft 6 by a high-speed clutch $C_3$. The reverse gear train Gr is constructed of a driving gear 23 made integral with the driving gear 19 of the middle-speed gear train $G_2$, a driven gear 24 connected to the output shaft 6 by the switching clutch Cs, and an idler gear 25 meshing with the two gears 23 and 24. The switching clutch Cs is interposed between the driven gears 20 and 24 so that it is able to selectively connect either of the driven gears 20 and 24 to the output shaft 6 by the movement of a selector sleeve 26 of the switching clutch Cs to either a forward position at the left-hand side of the drawing or a backward position at the right-hand side.

If only the low-speed clutch $C_1$ is connected with the selector sleeve 26 held in the forward position, as shown, the driving gear 17 is connected to the input shaft 5 to establish the low-speed gear train $G_1$ by which torque is transmitted from the input shaft 5 to the output shaft 6. Next, if the middle-speed clutch $C_2$ is connected while the low-speed stage clutch $C_1$ is still applied, the driving gear 19 is connected to the input shaft 5 to establish the middle-speed gear train $G_2$ by which torque is transmitted from the input shaft 5 to the output shaft 6. During this time, the output shaft 6 is made to rotate at a higher speed than that of the driven gear 18 of the low-speed gear train $G_1$ by the difference in the speed-change ratio between the low- and middle-speed gear trains $G_1$ and $G_2$, so that the one-way clutch $C_0$ rotates idly to effectively halt the low-speed gear train $G_1$. While the low-speed clutch $C_1$ is still applied, if the middle-speed clutch $C_2$ is released and the high-speed clutch $C_3$ is applied, the driven gear 22 is connected to the output shaft 6 to establish the high-speed gear train $G_3$ by which torque is transmitted from the input shaft 5 to the output shaft 6. In this case, too, the one-way clutch $C_0$ idles in the same way as during the establishment of the middle-speed gear train $G_2$, to halt the low-speed gear train $G_1$. Next, if the selector sleeve 26 is moved to its rightward rear position to effect the connection of only the middle-speed clutch $C_2$, the driving gear 23 is connected to the input shaft 5 and the driven gear 24 is connected to the output shaft 6 to establish the reverse gear train Gr by which torque is transmitted from the input shaft 5 to the output shaft 6.

The torque thus transmitted to the output shaft 6 is further transmitted from an output gear 27 attached onto the end portion of the output shaft 6, to a large-diameter gear 28 of the differential mechanism Df.

FIG. 2 shows a combination of a typical example of a hydraulic circuit for controlling the operations of the low-, middle-, and high-speed clutches $C_1$, $C_2$, and $C_3$ of FIG. 1 and an example of a controller Dc for controlling the direct-coupling clutch Cd, which is based on the present invention. As shown, the hydraulic pump P pumps oil from an oil reservoir R into an actuation oil line 29. This pressurized oil is fed to a manual valve Vm after it has been regulated to a predetermined pressure by the regulator valve Vr. This oil pressure is called a line pressure Pl.

The regulator valve Vr is constructed of a pressure-regulating spring 30 and a spring-receiving sleeve 31 holding the outer end of the spring. This spring-receiving sleeve 31 can be moved to the right or left to increase or decrease the load set by the pressure-regulating spring 30. The stator arm 4b abuts against the outer face of the spring-receiving sleeve 31 so that the reaction exerted upon the stator 4, i.e., the stator reaction, is applied to the spring-receiving sleeve 31. A stator spring 32 for bearing the stator reaction is also connected to the spring-receiving sleeve 31 so that if the stator reaction is increased, the stator spring 32 is compressed, moving the spring-receiving sleeve 31 to the left to increase the load set by the pressure-regulating spring 30 so that the oil pressure in the actuation oil line 29 is increased.

The oil, whose pressure is regulated by the regulator valve Vr, is partially introduced through an inlet oil line 34 provided with a throttling orifice 33 into the torque converter T to increase the pressure therein to prevent cavitation. This internal pressure is determined by the effective area of the throttling orifice 33, the strength of a spring 37 of a check valve 36 disposed in an outlet oil line 35 of the torque converter, etc.

The oil which has passed through the check valve 36 is returned through an oil cooler (not shown) to the oil reservoir R.

The excess pressurized oil discharged from the hydraulic pump P is introduced from the regulator valve Vr to a lubrication oil line 38 from which it is supplied to the corresponding lubrication portions. In order to ensure the minimum oil pressure required for this, a pressure-regulating valve 39 is connected to the lubrication oil line 38.

The pressurized oil supplied to a manual valve Vm is not further supplied to any of the hydraulically actuated portions such as the clutches $C_1$, $C_2$ and $C_3$ when the valve Vm is in a neutral position N, as shown. When the valve Vm is moved one step to the left from the position shown to a drive position D, the actuation oil line 29 leading from the hydraulic pump P communicates with an actuation oil line $41_1$ which leads to a hydraulic cylinder $40_1$ of the low-speed clutch $C_1$, and an actuation oil line 43 which leads to a spring chamber 42 of a hydraulic servo motor Sm for moving the selector sleeve 26. As a result, the low-speed clutch $C_1$ is applied (or connected) to establish the low-speed gear train $G_1$, as described above. At the same time, a piston 44 of the servo motor Sm is left in a leftward position, as shown, to hold the selector sleeve 26 in its forward position shown in FIG. 1 by a shift fork 45 so that the reverse gear train Gr is held inoperative.

An inlet oil line 46 leading to the input port of a governor valve Vg branches off the actuation oil line 43 leading to the spring chamber 42 of the servo motor Sm. A first signal oil line $47_1$ leads from an output port of the governor valve Vg.

The governor valve Vg is of a known type which is rotated about its axis of rotation 49 by the action of a gear 48 meshing with the large-diameter gear 28 of the differential mechanism Df. As a result, since the governor valve Vg has a rotational speed proportional to the vehicle speed, it is able to output an oil pressure proportional to the vehicle speed, i.e., a governor pressure Pg in the first signal oil line $47_1$, by the action of the centrifugal force exerted on a weight 51 of a spool valve member 50.

An inlet oil line 53 leading to the input port of a throttle valve Vt also branches off the actuation oil line 46. A second signal oil line $47_2$ leads from an output port of the throttle valve Vt. Partway along the input oil line 53, a modulator valve 54 which regulates the upper limit of the pressure input to the throttle valve Vt is provided.

The throttle valve Vt is of a known type and is constructed of a spool valve member 55, a control spring 58 pushing the valve member 55 to the left, a return spring 57 pushing the valve member 55 to the right, a control piston 59 holding the outer end of the control spring 58, a control cam 60 adapted to rotate in response to the increase in the degree of opening of the throttle valve of the engine E to move the control piston 59 to the left, and an adjustment bolt 61 for adjusting the load set by the return spring 57. When the control piston 59 is moved to the left, its displacement pushes the spool valve member 55 to the left through the control spring 58. The oil pressure output to the second signal oil line $47_2$ in accordance with the leftward movement is exerted upon a leftward shoulder portion 55a of the spool valve member 55 so that the spool valve member 55 is pushed to return to the right. As a result, the throttle valve Vt can eventually output an oil pressure proportional to the degree of opening of the throttle valve of the engine E, i.e., a throttle pressure Pt, to the second signal oil line $47_2$.

The first and second signal oil lines $47_1$ and $47_2$ are connected, respectively, to pilot oil pressure chambers 62 and 62', and 63 and 63' at either end of a low-middle speed shift valve $V_1$ and a middle-high speed shift valve $V_2$. As a result, corresponding spool valve members 64 and 65 of the shift valves $V_1$ and $V_2$ are actuated in the following manner when they receive the governor pressure Pg and throttle pressure Pt at either end.

Specifically, the spool valve member 64 of the low-middle speed shift valve $V_1$ originally remains at the shown rightward position because of the force of a spring 66. However, when the vehicle speed increases, which increases the governor pressure Pg so that the leftward force of the governor pressure Pg on the spool valve member 64 overcomes the rightward force of the throttle pressure Pt and the spring 66 on the valve member 64, balls 68 which move together with the valve member 64 ride over a fixed positioning land 69 in a click motion mechanism 67 provided near the right-hand end of the valve member 64, so that the valve member 64 is abruptly switched to a left-hand position in a snap action. As a result, the oil pressure from the hydraulic pump P, which had been supplied only to the hydraulic cylinder $40_1$ of the low-speed clutch $C_1$ until then, is supplied through actuation oil lines 70, 71, and $41_2$ to a hydraulic cylinder $40_2$ of the middle-speed clutch $C_2$ as well, so that the two clutches $C_1$ and $C_2$ are applied to establish the middle-speed gear train $G_2$, as described before.

When the vehicle speed increases further, the middle-high speed shift valve $V_2$ performs a similar action so that its spool valve member 65 is moved to the left by the increasing governor pressure Pg to open the actuation oil lines $41_2$ and 71 into the oil reservoir R, and to provide communication between the actuation oil line 70 and an actuation oil line $41_3$ which leads to a hydraulic cylinder $40_3$ of the high-speed clutch $C_3$. As a result, the middle-speed clutch $C_2$ is released, and the low-speed clutch $C_1$ and the high-speed clutch $C_3$ are applied to establish the high-speed gear train $G_3$, as described before.

Figure 4:
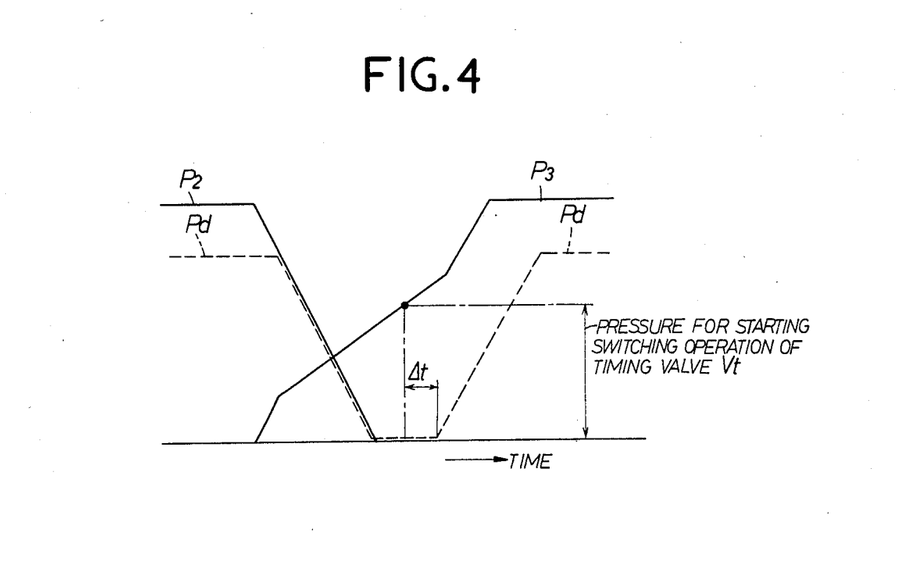
FIG. 4 is a graph of the transient characteristics of the working oil pressure of the direct-coupling clutch while the speed is changing.

During this time, in order to absorb shocks due to the changes in speed, working oil pressures $P_2$ and $P_3$ of the middle-speed clutch $C_2$ and the high-speed clutch $C_3$ are changed over by a transient state in which the process of decreasing the oil pressure $P_2$ and the process of increasing the oil pressure $P_3$ temporarily overlap, as shown in FIG. 4, because of the actions of accumulators 72 and 73, a one-way valve 74, an orifice control valve 75, etc.

Figure 3:
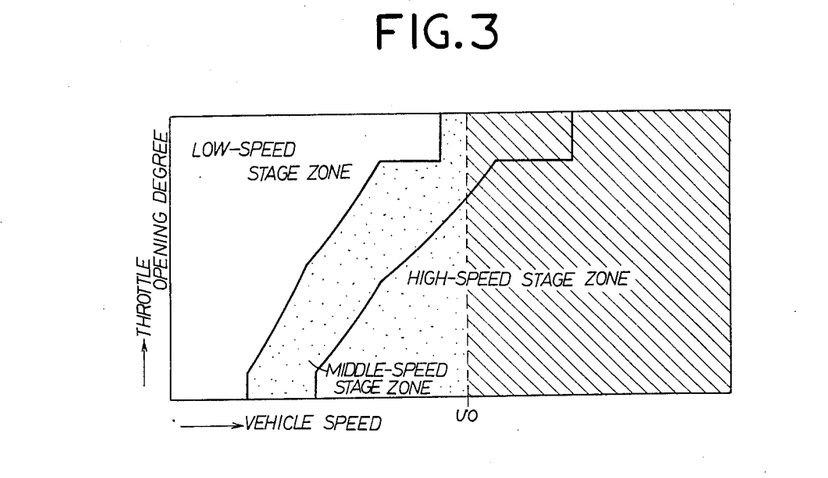
FIG. 3 is a graph of the speed-change characteristics of the automatic transmission.

Thus it is possible to draw a speed-change chart which is divided by solid lines as in FIG. 3, as is well known in the art. As a matter of fact, the speed-change charts for the shift-up and -down operations are different because of the click motion mechanisms 67 provided in each of the shift valves $V_1$ and $V_2$. However, this is known in the art and does not have very significant meaning as far as the present invention is concerned, so only the chart for the shift-up operation is shown.

When the manual valve Vm is moved to a shift position other than the drive position D, such as a middle-speed holding position II or a reverse position Re, the corresponding middle-speed gear train $G_2$ or reverse gear train Gr is established. However, this does not have any particularly important relationship with the present invention, so that any further explanation thereof is omitted here. Of the shift positions of the manual valve Vm, incidentally, Pk indicates a parking position.

The hydraulic circuit thus far described is well known in the art.

A controller Dc of the direct-coupling clutch Cd of the present invention will now be described with reference to FIG. 2. The controller Dc of the embodiment shown is constructed of the timing valve Vt, a reduction valve Vd, and a vehicle speed response valve Vs.

The timing valve Vt is constructed of a spool valve member 80 which can move between a first switching position at the right-hand side and a second switching position at the left-hand side, a spring 81 pushing the valve member 80 toward the first switching position, a first pilot oil pressure chamber 82 facing the left-hand end face of the valve member 80, a second pilot oil pressure chamber 82' facing the right-hand end face of the valve member 80, a click motion mechanism 83 imparting a snap action to the valve member 80, first and second input ports 84 and 84', and an output port 85. The first input port 84 communicates with the output port 85 when the valve member 80 is in the first switching position, and the second input port 84' communicates with the output port 85 when the valve member 80 is moved to the second switching position. An oil line $41_3'$ branching off the actuating oil line $41_3$ of the high-speed clutch $C_3$ is connected to the first input port 84 and the first pilot oil pressure chamber 82. Similarly, an oil line $41_2'$ branching off the actuating oil line $41_2$ of the middle-speed clutch $C_2$ is connected to the second input port 84' and the second pilot oil pressure chamber 82'. Throttling orifices 86 and 86' are formed at the inlets of the first and second pilot oil pressure chambers 82 and 82', respectively. The click motion mechanism 83 is constructed of, in the same way as the click mechanism 67 in the low-middle speed shift valve $V_1$, balls 87 which move together with the spool valve member 80, and a stationary regulating plate 89 with a circumferential, inwardly directed positioning land 88. As a result, the valve member 80 normally stays in the first switching position because of the biasing force of the spring 81, but, when the oil pressure in the second pilot oil pressure chamber 82' exceeds a predetermined level, the click balls 87 ride over the positioning land 88 to abruptly move the valve member 80 to the second switching position.

The reduction valve Vd is constructed of a spool valve member 90 which can move between an open position at the left-hand side and a closed position at the right-hand side; a spring 91 pushing the valve member 90 toward the open position, a pilot oil pressure chamber 92 facing the left-hand end face of the valve member 90, and input and output ports 93 and 94. The output oil line 95 leading out of the output port 85 of the timing valve Vt is connected to the input port 93. The output port 94 communicates with the pilot oil pressure chamber 92 through an orifice 96 in the spool valve member 90, and also with the hydraulic cylinder 14 of the direct-coupling clutch Cd through an output oil line 97.

The vehicle speed response valve Vs is constructed of a spool valve member 98 which can move between a closed position at the right-hand side and an open position at the left-hand side, a spring 99 pushing the valve member 98 toward the closed position, a pilot oil pressure chamber 100 facing the right-hand end face of the valve member 98, a click motion mechanism 101 of the same construction as that of the mechanism 83 of the timing valve Vt which imparts a snap action to the valve member 98, and input and output ports 102 and 103. An oil line $47_1'$ branching off from the first signal oil line $47_1$ is connected to the pilot oil pressure chamber 100. The output oil line 95 of the timing valve Vt is connected to the output port 103. Thus the reduction valve Vd and the vehicle speed response valve Vs are disposed in parallel between the oil lines 95 and 97 connecting the timing valve Vt and the direct-coupling clutch Cd.

The operations of the controller Dc will be explained in the following.

First of all, assume that the vehicle is running at a relatively low speed because of the establishment of the low-speed gear train $G_1$. Since, in this case, the low-speed clutch $C_1$ is operating, the actuating oil lines $41_2$ and $41_3$ of the middle- and high-speed clutches $C_2$ and $C_3$ communicate with the oil reservoir R. Since, moreover, the output oil pressure of the governor valve Vg, i.e., the governor pressure Pg, is relatively low, all of the timing valve Vt, the reduction valve Vd, and the vehicle speed response valve Vs are in the states shown, so that the hydraulic cylinder 14 of the direct-coupling clutch Cd is at atmospheric pressure.

Since the line pressure Pl is partially introduced through the throttle 33 to the torque converter, however, the piston 13 of the direct-coupling clutch Cd is moved to the left by the pressure within the torque converter T to release the clutch Cd.

If the vehicle speed is increased from that state so that the middle-speed clutch $C_2$ is supplied with the working oil ressure from the actuation oil line $41_2$ and the middle-speed gear train $G_2$ is established, the oil pressure is simultaneously introduced through the oil line $41_2'$ into the second pilot oil pressure chamber 82' of the timing valve Vt. When the oil pressure reaches a predetermined level, the valve member 80 moves leftward to its second switching position. As a result, the oil pressure is introduced from the second input port 84' to the output port 85, then from the output oil line 95 through the input and output ports 93 and 94 of the open reduction valve Vd, and then through the output oil line 97 to the hydraulic cylinder 14 of the direct-coupling clutch Cd so that it moves the piston 13 to the right to start the clutch Cd operating.

When the piston 13 is moved to the right to start the application or connection of the direct-coupling clutch Cd, the oil pressure in the hydraulic cylinder 14 thereof is increased so that the oil pressure in the pilot oil pressure chamber 92 of the reduction valve Vd also increases. When this increased oil pressure exceeds a predetermined level, the valve member 90 is moved to the right to block the communication between the input and output ports 93 and 94 so that any further increase in the coupling force of the direct-coupling clutch Cd is prevented. Thus, a zone within which the direct-coupling clutch Cd is weakly applied is obtained, indicated by the stippled zone in FIG. 3.

Now follows a description of the shift-up operation in which the working oil pressure is released from the middle-speed clutch $C_2$, as the vehicle speed is increased from the above state, so as to establish the high-speed gear train $G_3$ and in which the high-speed clutch $C_3$ operates in response to the working oil pressure from the actuation oil line $41_3$.

During this time, the process of increasing and decreasing the working oil pressures $P_2$ and $P_3$ of the middle-speed clutch $C_2$ and the high-speed clutch $C_3$ temporarily overlap, as shown in FIG. 4, as described above.

As a result, in accordance with the reduction in the working oil pressure $P_2$ of the middle-speed clutch $C_2$, the working oil pressure Pd of the direct-coupling clutch Cd is first discharged through the reduction valve Vd and the timing valve Vt, which are both open, to the actuation oil line $41_2$ so that the pressure drops promptly to release the operation of the direct-coupling clutch Cd.

Subsequently, the working oil pressure of the high-speed clutch $C_3$ is increased. A portion of this increased oil pressure is introduced through the orifice 86 into the first pilot oil pressure chamber 82 of the timing valve Vt to move the valve member 80 rightward to its first switching position. Because of the operating resistance of the click motion mechanism however, the switching of the valve member 80 is not effected before the oil pressure in the first pilot oil pressure chamber 82 rises to a predetermined level.

When the oil pressure in the first pilot oil pressure chamber 82 rises to the predetermined level, the valve member 80 starts to switch to its first switching position, but its switching speed is gently controlled by the throttling resistances of the two orifices 86 and 86'. As a result, after a delay of a predetermined time $\Delta t$ after the rise in the working oil pressure of the high-speed clutch $C_3$, the valve member 80 is switched over so that the working oil pressure of the high-speed clutch $C_3$ is supplied to the hydraulic cylinder 14 of the direct-coupling clutch Cd. By selecting the sizes of the orifices 86 and 86', the delay time $\Delta t$ can be set as appropriate in that the direct-coupling clutch can be reconnected after the end of the operation of establishing the high-speed gear train $G_3$.

If the vehicle speed increases further so as to exceed a predetermined value vo, the governor pressure Pg introduced through the oil line $47_1'$ to the pilot oil pressure chamber 100 of the vehicle speed response valve Vs reaches a predetermined actuation level to move the valve member 98 to the left so that the input port 102 communicates with the output port 103 to short-circuit the reduction valve Vd. As a result, the output oil pressure of the timing valve Vt is not reduced at all and is supplied to the hydraulic cylinder 14 of the direct-coupling clutch Cd, so that it is possible to obtain a zone within which the direct-coupling clutch Cd is strongly applied, shown by the hatched zone in FIG. 3.

The description thus far made has concerned the shift-up operations from the low-speed range to the middle-speed range, and from the middle-speed range to the high-speed range. It is obvious that, in the opposite shift-down operations, similar action occur to release the direct-coupling clutch Cd as the speed changes, except that the timing valve Vt is switched from the second switching position to the first switching position.

In the timing valve Vt, however, the action of the spring 81 means that the pressure for starting the switching of the timing valve Vt is higher than the pressure for starting the switching of the valve member 80 from its first switching positon to its second switching position, so that generation of shocks during the changes of speed can be prevented as much as possible and the phenomena of sudden increases in engine speed can be controlled.

More specifically, when running with the high-speed gear train $G_3$ operating, if the throttle valve of the engine E is suddenly opened to abruptly accelerate the vehicle, "kick-down" occurs in which the operation of the gear trains is switched from the high-speed range to the middle-speed range. At the same time, the speed of the engine E is increased across the speed change boundary by the difference in speed-change ratios of the two gear trains $G_2$ and $G_3$ so that the speed-change shocks are less if the direct-coupling clutch Cd is reconnected while the engine speed is increased. Since, however, the crankshaft 1 of the engine E has an intrinsic inertia, there is some delay before the speed is increased in this way. Since, therefore, the pressure at which the valve member 80 of the timing valve Vt starts to switch from the first switching position to the second switching position is set at a relatively high valve, the direct-coupling clutch Cd can be reconnected after a lapse of time corresponding to this delay so that speed-change shocks can be prevented from occurring.

On the other hand, a "shift-up", during which the operation of the gear trains is switched from the middle-speed range to the high-speed range, is a speed change in which the speed of the engine E is reduced by the difference in the speed-change ratios of the two gear trains $G_2$ and $G_3$. Consequently, no sudden increase in the engine speed occurs if the direct-coupling clutch Cd is reconnected slightly earlier. Thus, since the pressure at which the valve member 80 of the timing valve Vt starts to switch from the second switching position to the first switching position is set at a relatively low level, the direct-coupling clutch Cd can be reconnected earlier so that the speed change can be effected smoothly without any sudden increase in the engine speed.

In the timing valve Vt, incidentally, if the degree of throttling of the orifices 86 and 86' is set suitably, the desired switching timing can be obtained without the use of the snap action motion mechanism 83.

In the description thus far made, the middle-speed clutch $C_2$ and the high-speed clutch $C_3$ together constitute hydraulic friction elements of the present invention, whereas the snap action motion mechanisms 83 and the orifices 86 and 86' together constitute delay means.

As has been described hereinbefore, according to the present invention, a hydraulic cylinder of a direct-coupling clutch and hydraulic cylinder of at least two friction elements that have adjacent operational order are connected by a timing valve which has a first switching position at which the working oil pressure of one of the friction elements can be supplied to the hydraulic cylinder of the direct-coupling clutch, and a second switching position at which the working oil pressure of the other friction element can be supplied to the hydraulic cylinder of the direct-coupling clutch; the timing valve is provided with a first pilot oil pressure chamber to which is applied oil pressure to move the timing valve to the first switching position and a second pilot oil pressure chamber to which is applied oil pressure to move the timing valve to the second switching position; and the first and second pilot oil pressure chambers are connected to the corresponding hydraulic cylinders of the friction elements which communicate with the hydraulic cylinder of the direct-coupling clutch. As a result, during a change of speed, the operation of the direct-coupling clutch is temporarily released by the switching of the timing valve so that the speed change can be conducted in a smooth manner. Consequently, the direct-coupling clutch can be operated within a range as wide as possible over the operations of at least two gear train stages, which markedly reduces the practical fuel consumption.

Incidentally, if the timing valve is equipped with a delay means for starting the switching of the friction elements a predetermined period of time after the working oil pressure has been applied to the friction elements, the direct-coupling clutch can be reconnected to wait until the working oil pressure of the friction element of the next stage is sufficiently increased, so that an even smoother speed change can be ensured.

Further according to invention, moreover, in addition to the construction of the invention as described above, the oil line connecting the timing valve and the direct-coupling clutch is provided with a reduction valve which closes the oil line when the working oil pressure of the direct-coupling clutch reaches a predetermined level, and a parallel vehicle speed response valve which opens the oil line when the vehicle speed exceeds a predetermined value. As a result, when the direct-coupling clutch is applied from a low-speed range, its coupling force can be controlled to be only a weak force within that range by the action of the reduction valve. Consequently, a suitable degree of slip occurs in the direct-coupling clutch during the acceleration to share the power between the mechanical transmission provided by the torque converter, i.e., to make use of the torque-amplifying function of the torque converter, so that a satisfactory power performance can be obtained. In the high-speed range, moreover, the coupling force of the direct-coupling clutch is strengthened by the action of the vehicle speed response valve so that a highly efficient transmission without any slippage can be achieved. When it is cold, the response with which the direct-coupling clutch is released is generally bad. In such weather, however, the coupling force of the direct-coupling clutch can be controlled to be relatively weak within the normal range by the coactions of the reduction valve and vehicle speed response valve, to allow the direct-coupling clutch to suitably slip so that the difficulty raised by the response delay can be eliminated.

It is readily apparent that the above-described direct coupling controller meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A direct-coupling controller for a torque converter in a vehicular automatic transmission, the torque converter including an input member provided with a pump rotor and an output member provided with a turbine rotor; the transmission further including a direct-coupling clutch interposed between the input and output members for mechanically coupling them together, the clutch including a hydraulic cylinder for actuation thereof, and an auxiliary transmission including a plurality of stages of gear trains for transmitting the torque of the output member to a drive wheel, each of the gear trains having a hydraulically operated friction element for actuation thereof, each friction element including a hydraulic cylinder;

said direct-coupling controller comprising a timing valve interconnecting the hydraulic cylinder of the direct-coupling clutch and the hydraulic cylinder of at least two of the friction elements that are of adjacent operational order; said timing valve having and being movable between a first switching position in which working oil pressure of the hydraulic cylinder of one of the friction elements is supplied to the hydraulic cylinder of the direct-coupling clutch, and a second switching position in which working oil pressure of the hydraulic cylinder of the other of the friction elements is supplied to the hydraulic cylinder of the direct-coupling clutch; said timing valve including a first pilot oil pressure chamber to which is applied oil pressure to move said timing valve to said first switching position and a second pilot oil pressure chamber to which is applied oil pressure to move said timing valve to said second switching position; said first pilot oil pressure chamber being connected to the hydraulic cylinder of said one of the friction elements and the second pilot oil pressure chamber being connected to the hydraulic cylinder of said other of the friction elements, said timing valve including delay means for delaying movement between switching positions for a predetermined period of time after working oil pressure has been applied to said friction elements.

2. The direct-coupling controller as set forth in claim 1, wherein said timing valve includes a spool valve member slideable in a bore, a spring biasing said spool valve member toward said first switching position, said first pilot oil pressure chamber being formed in said bore at a first end face of said spool valve member adjacent said spring, said second pilot oil pressure chamber being formed in said bore at a second end face of said spool valve member opposite said first end face, said valve having an output port connectible to the hydraulic cylinder of the clutch, a first input port communicating with the output port when said spool valve member is in said first position and connectible to the hydraulic cylinder of said one of the friction elements, and a second input port communicating with said output port when said spool valve member is in said second switching position and connectible to the hydraulic cylinder of said other of the friction elements.

3. The direct-coupling controller as set forth in claim 2, wherein each of said first and second pilot oil pressure chambers has an inlet, and said delay means comprises a snap action mechanism in said second pilot oil pressure chamber operatively associated with said spool valve member, a throttling orifice in said inlet of said first pilot oil pressure chamber, and a throttling orifice in said inlet of said second pilot oil pressure chamber.

4. The direct-coupling controller as set forth in claim 3, wherein said snap action mechanism comprises a stationary regulating plate mounted in said bore, a circumferential, inwardly directed positioning land on said regulating plate, a pair of balls radially movably mounted in said spool valve member, and means in said spool valve member biassing said pair of balls into contact with said regulating plate.

5. A direct-coupling controller for a torque converter in a vehicular automatic transmission, the torque converter including an input member provided with a pump rotor and an output member provided with a turbine rotor; the transmission further including a direct-coupling clutch interposed between the input and output members for mechanically coupling them together, the clutch including a hydraulic cylinder for actuation thereof, and an auxiliary transmission including a plurality of stages of gear trains for transmitting the torque of the output member to a drive wheel, each of the gear trains having a hydraulically operated friction element for actuation thereof, each friction element including a hydraulic cylinder;

said direct-coupling controller comprising a timing valve interconnecting the hydraulic cylinder of the direct-coupling clutch and the hydraulic cylinders of at least two of the friction elements that are of adjacent operational order; said timing valve having and being movable between a first switching position in which working oil pressure of the hydraulic cylinder of one of the friction elements is supplied to the hydraulic cylinder of the direct-coupling clutch, and a second switching position in which working oil pressure of the hydraulic cylinder of the other of the friction elements is supplied to the hydraulic cylinder of the direct-coupling clutch; said timing valve including a first pilot oil pressure chamber to which is applied oil pressure to move said timing valve to said first switching position and a second pilot oil pressure chamber to which is applied oil pressure to move said timing valve to said second switching position; said first pilot oil pressure chamber being connected to the hydraulic cylinder of said one of the friction elements and the second pilot oil pressure chamber being connected to the hydraulic cylinder of said other of the friction elements, said timing valve including delay means for delaying movement between switching positions for a predetermined period of time after working oil pressure has been applied to said friction elements;

an oil line connecting said timing valve to the hydraulic cylinder of the clutch;

a reduction valve in said oil line for closing said oil line when the working oil pressure of the clutch reaches a predetermined level; and a vehicle speed response valve in said oil line in parallel with said reduction valve for opening said oil line when vehicle speed exceeds a predetermined value.

6. The direct-coupling controller as set forth in claim 5, wherein said vehicle speed response valve is associated with said reduction valve in such a manner that the vehicle speed response valve allows an oil pressure above said predetermined level to be fed to the clutch while bypassing the reduction valve when the vehicle speed exceeds the predetermined value.

* * * * *